UNITED STATES PATENT OFFICE.

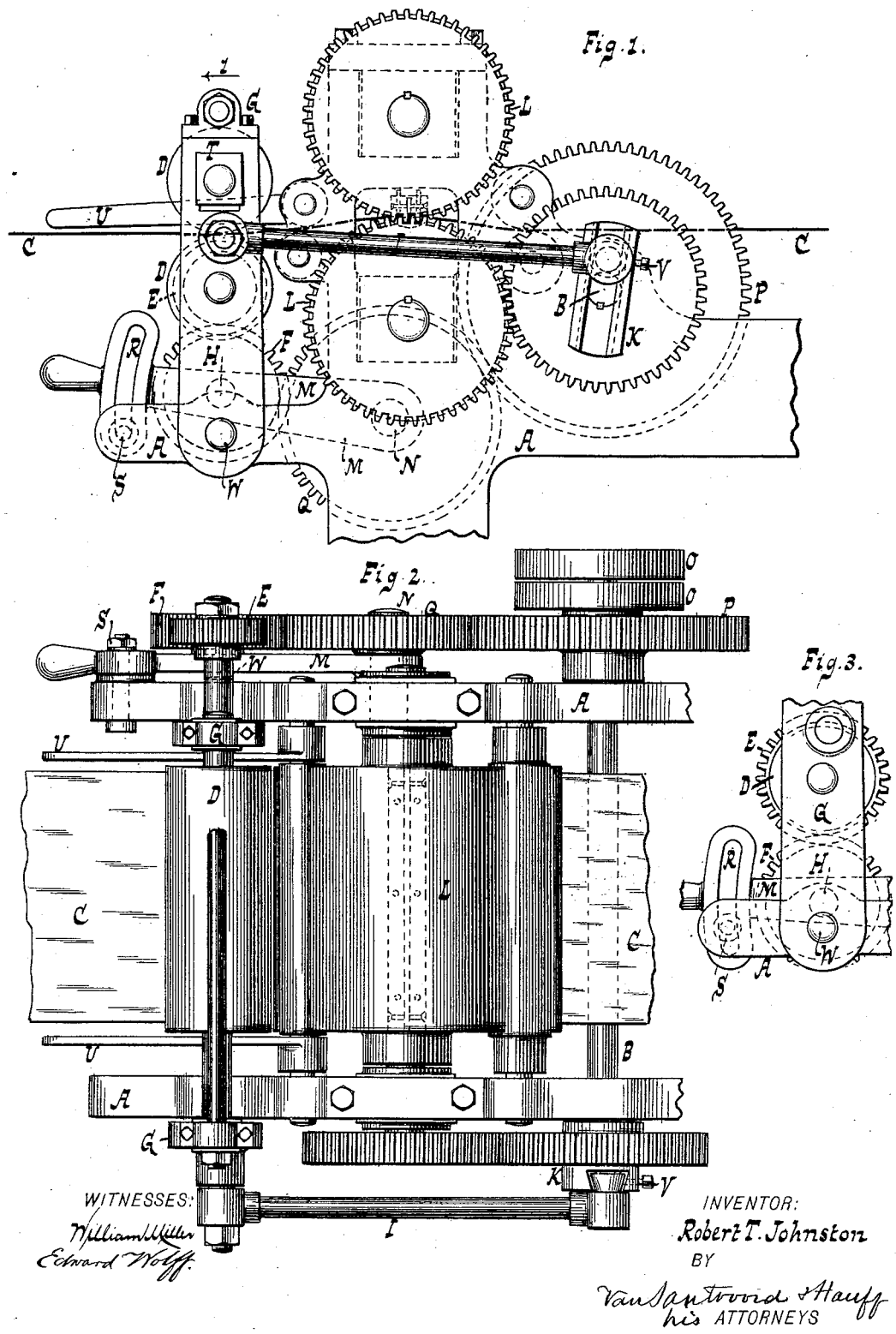

ROBERT T. JOHNSTON, OF SCOTCH PLAINS, NEW JERSEY.

MECHANISM FOR FEEDING AND CUTTING PAPER.

SPECIFICATION forming part of Letters Patent No. 481,497, dated August 23, 1892.

Application filed October 15, 1891. Serial No. 408,782. (No model.)

*To all whom it may concern:*

Be it known that I, ROBERT T. JOHNSTON, a citizen of the United States, residing at Scotch Plains, in the county of Union and State of New Jersey, have invented new and useful Improvements in Mechanism for Feeding and Cutting Paper, of which the following is a specification.

This invention relates to mechanism for feeding and cutting paper; and by means of this invention the feed of the paper is interrupted during the cutting operation, as set forth in the following specification and claims, and illustrated in the accompanying drawings, in which—

Figure 1 is a side elevation of the feeding and cutting mechanism. Fig. 2 is a plan view of the mechanism. Fig. 3 shows a modified arrangement.

In the drawings the letter A indicates a frame or support having a driving-shaft B, provided with the usual fast and loose pulleys O. Said driving-shaft can be run from the other mechanism connected with the device, such as a printing-press. The driving-shaft is provided with a gear P, meshing into gear Q, which drives gear F. One of the feed-rollers D D is provided with a gear E, which meshes into gear F, so that the first-named feed-roller is rotated, the frictional contact between the feed-rollers being sufficient to rotate the other feed-roller.

The sheet or web C to be cut is fed by the feed-rollers D D to the cutting-rollers or cutter L. These rollers D are shown mounted on arms G, which swing on a stud or shaft W, supported by frame A. The arms G are oscillated by a pitman I and crank or crank-pin K.

During the operation of cutting by the cutter L the arm G is oscillated by the pitman I in the direction of arrow 1, Fig. 1, thus neutralizing the feeding action of the rollers D and causing the web to remain stationary between the cutter L and the rollers D. The motion of the arms G in the opposite direction will assist the feeding action of rollers D. The shaft or stud H of gear F is supported by an adjustable arm M, swinging on shaft N of gear Q. The arm M has a slot R, into which enters the set-screw S, so that the arm M can be adjusted and fixed at any desired point, according as a larger or smaller gear E is put on the feed-roller. The upper feed-roller D is shown as having its shaft mounted in boxes T, movable in the arms G, and a lever or arm U enables the upper roller D to be lifted away from the lower one when a fresh web is to be inserted. The pitman I can be adjusted in the crank or arm K, as desired, and fixed in position by a screw V. The gear E is made removable, so that gears of various sizes can be applied to mesh into gear F, which latter gear is mounted on the adjustable arm M, as stated, so that the gear F can be set to mesh into the various gears E as they may be applied to the feed-roller. By using various sizes of gears E the speed of the feed-rollers can be varied to suit requirements. When the frame G is swung backward away from the cutting-rollers L, such backward motion neutralizes the feeding motion of the rollers D toward the cutting-rollers L, and consequently the feeding motion of the rollers is intermittently neutralized or rendered ineffective by the backward motion of the frame or arms G, which backward motion is of such speed as to accomplish the result stated. The effect is the same as though the rollers D ceased rotating, in that there is a cessation in the feeding of the sheets C. After being cut the paper is fed off in any usual well-known way to be printed upon or otherwise utilized. In Fig. 1, the gear E being comparatively small, the speed of the feed-rollers D will be greater than when a larger gear E, as shown in Fig. 3, is inserted.

What I claim as new, and desire to secure by Letters Patent, is—

1. The combination of a rotary cutter, an oscillating frame, feed-rollers acting to feed a sheet to the rotary cutter and journaled in the oscillating frame for neutralizing the feed action of the rollers on the sheet as the frame swings backward or away from the rotary cutter, and means for rotating the cutter, oscillating the frame, and rotating the feed-rollers, substantially as described.

2. The combination, with a cutter, of rotary oscillating feed-rollers, a removable gear, as E, connected to said rollers, and an adjustable gear, as F, for driving the removable gear, substantially as described.

3. The combination, with a cutter, of rotary feed-rollers, an oscillating frame or arms for said rollers, and a pitman and crank for oscillating the arms, said pitman being adjustably connected to the crank, substantially as described.

4. The combination, with a cutter, of rotary oscillating feed-rollers, a removable gear, as E, connected to said rollers, a gear F for driving the removable gear, and an adjustable arm and set-screw for supporting the gear F, substantially as described.

In testimony whereof I have hereunto set my hand in the presence of two subscribing witnesses.

ROBERT T. JOHNSTON.

Witnesses:
WM. C. HAUFF,
E. F. KASTENHUBER.